US008671195B2

(12) United States Patent
Rothschild (10) Patent No.: US 8,671,195 B2
(45) Date of Patent: Mar. 11, 2014

(54) DIGITAL MEDIA COMMUNICATION PROTOCOL

(76) Inventor: Leigh Rothschild, Sunny Isles, FL (US)

( * ) Notice: Subject to any disclaimer, the term of this patent is extended or adjusted under 35 U.S.C. 154(b) by 1522 days.

(21) Appl. No.: 11/999,570

(22) Filed: Dec. 7, 2007

(65) Prior Publication Data

US 2009/0150554 A1    Jun. 11, 2009

(51) Int. Cl.
*G06F 15/16* (2006.01)
*G06F 15/173* (2006.01)

(52) U.S. Cl.
USPC ........................................... 709/225; 709/229

(58) Field of Classification Search
USPC ................................................ 709/225, 229
See application file for complete search history.

(56) References Cited

U.S. PATENT DOCUMENTS

| | | | |
|---|---|---|---|
| 4,672,572 A | 6/1987 | Alsberg | |
| 5,555,407 A | 9/1996 | Cloutier et al. | |
| 5,694,546 A | 12/1997 | Reisman | |
| 5,805,442 A | 9/1998 | Crater et al. | |
| 5,857,187 A | 1/1999 | Uenoyama et al. | |
| 5,892,825 A | 4/1999 | Mages et al. | |
| 5,915,093 A | 6/1999 | Berlin et al. | |
| 5,922,045 A | 7/1999 | Hanson | |
| 5,937,158 A | 8/1999 | Uranaka | |
| 5,996,000 A | 11/1999 | Shuster | |
| 6,101,534 A | 8/2000 | Rothschild | |
| 6,145,088 A | 11/2000 | Stevens | |
| 6,594,692 B1 | 7/2003 | Reisman | |
| 7,631,084 B2 * | 12/2009 | Thomas et al. | 709/227 |
| 7,711,783 B1 * | 5/2010 | Violleau et al. | 709/206 |
| 8,264,352 B2 | 9/2012 | Holley et al. | |
| 2004/0128375 A1 * | 7/2004 | Rockwell | 709/223 |
| 2005/0120381 A1 | 6/2005 | Yamaguchi | |
| 2005/0165795 A1 | 7/2005 | Myka et al. | |
| 2006/0146765 A1 | 7/2006 | Van de Sluis et al. | |
| 2006/0174206 A1 | 8/2006 | Jung et al. | |
| 2008/0120369 A1 * | 5/2008 | Gustavsson | 709/204 |
| 2011/0202993 A1 | 8/2011 | Rothschild | |
| 2012/0254360 A1 | 10/2012 | Rothschild | |

FOREIGN PATENT DOCUMENTS

| | | |
|---|---|---|
| EP | 1550968 A1 | 7/2005 |
| WO | 2008059325 A | 5/2008 |

OTHER PUBLICATIONS

U.S. District Court—S.D. of Florida, Civil Docket for Case No. 06-CV-21359, *Rothschild Trust* v. *Citrix Systems, Inc., et al.* (Printed Dec. 17, 2008 / Miami, FL).
Complaint [Case No. 06-CV-21359 / Entered May 31, 2006 / Miami, FL].
Defendants' Answer to Complaint [Case No. 06-CV-21359 / Entered Jun. 16, 2006 / Miami, FL].
Plaintiff's Disclosure of Asserted Claims and Preliminary Infringement Contentions [Case No. 06-CV-21359 / Entered Sep. 11, 2006 / Miami, FL].

(Continued)

*Primary Examiner* — Larry Donaghue (57) ABSTRACT

A digital media communication protocol structured to selectively transmit one or more digital media files between a media terminal and a media node via a communication link on an interactive computer network. The communication link is initiated by the media terminal, wherein the media terminal is disposed in an accessible relation to the interactive computer network. The digital media communication protocol, and in particular, the communication link, is further structured to bypass at least one security measure, such as, for example, a password, security key, and/or firewall.

23 Claims, 4 Drawing Sheets

(56) References Cited

OTHER PUBLICATIONS

Plaintiff's Unopposed Motion for Enlargement of Time to File Joint Claim Construction and Prehearing Statement [Case No. 06-CV-21359 / Entered Dec. 18, 2006 / Miami, FL].
Rothschild Trust's Prehearing Statement [Case No. 06-CV-21359 / Entered Jan. 26, 2007 / Miami, FL].
Rothschild Trust Holdings, LLC's Claim Construction Brief [Case No. 06-CV-21359 / Entered Feb. 26, 2007 / Miami, FL].
Notice of Conventional Filing [Case No. 06-CV-21359 / Entered Feb. 28, 2007 / Miami, FL].
Citrix Systems Inc.'s and Citrix Online, LLC's Opposition to Rothschild Trust Holdings, LLC's Claim Construction Brief [Case No. 06-CV-21359 /Entered Apr. 2, 2007 / Miami, FL].
Rothschild Trust Holdings, LLC's Claim Construction Opposition Brief [Case No. 06-CV-21359 / Entered Apr. 2, 2007 / Miami, FL].
Notice of Filing in Conventional Form Exhibits A through E of Rothschild Trust Holdings, LLC's Claim Construction . . . [Case No. 06-CV-21359 / Entered Apr. 6, 2007 / Miami, FL].
Citrix Systems Inc.'s & Citrix Online, LLC's Motion to Strike Untimely Claim Constructions and Evidence . . . [Case No. 06-CV-21359 / Entered Apr. 10, 2007 / Miam, FL].
Order on Claims Construction [Case No. 06-CV-21359 / Entered Jun. 5, 2007 / Miami, FL].
Plaintiff Rothschild Trust Holdings, LLC's Motion for Extension of Time to Permit Completion of Discovery [Case No. 06-CV-21359 / Entered Dec. 14, 2007 / Miami, FL].
Citrix's Motion for Summary Judgement That it Does Not Infringe the '534 Patent [Case No. 06-CV-21359 / Entered Jan. 10, 2008 / Miami, FL].
Local Rule 7.5(C) Statement of Material Facts in Support of Citrix's Motion for Summary Judgement That it Does Not . . . [Case No. 06-CV-21359 / Entered Jan. 10, 2008 / Miami, FL].
Memorandum of Law in Support of Citrix's Motion for Summary Judgement That it Does Not Infringe the '534 Patent [Case No. 06-CV-21359 / Entered Jan. 10, 2008 / Miami, FL].
Notice of Filing Declaration of Michael G. Strapp in Support of Citrix's Motion for Summary Judgement That it Does . . . [Case No. 06-CV-21359 / Entered Jan. 10, 2008 / Miami, FL].
U.S. District Court—S.D. Of Florida, Civil Docket for Case No. 1:06-CV-22921, *Rothschild Trust Holdings, LLC* v. *Orb Networks, Inc.* (Printed Dec. 17, 2008 / Miami, FL).
Complaint [Case No. 06-CV-22921 / Entered Dec. 7, 2006 / Miami, FL].
U.S. District Court—N.D. of CA (SF), Civil Docket for Case No. 3:07-cv-00400, *Orb Networks, Inc.* v. *Rothschild Trust Holdings, LLC* (Printed Dec. 17, 2008 / Miami, FL).
Complaint [Case No. 07-CV-00400 / Filed Jan. 22, 2007 / Miami, FL].
Takahashi, Dean. "A New Medium—The Bridge Solution: CD-Roms help give the illusion that the PC has no limits . . . " The Wall Street Journal. Dow Jones & Co. Mar. 20, 1997.
Ladd, Eric. "The Document Tags." Oct. 23, 2006. <http://www.sunsite.serc.iisc.ernet.in/virlib/html/platinum/ch4.htm>.
Creative Wonders/Electronic Arts. "ABC News Links—from CD-ROM Access." Aug. 17, 2007. <http://www.cdaccess.com/html/pc/abcnews.htm>.
Krushenisky, Cindy. "Reference Resources That Make the Best Reports Even Better." Smart Computing. Aug. 17, 2007. <http://www.smartcomputing.com>.
Iqbal, M.S. & Poon, F.S.F, "A Simplified & an Efficient Packet Level Internet Access Control Scheme." Ethertech Conslt Ltd., U.K. 1992.
Heylighen, Francis, "World Wide Web: a distributed hypermedia paradigm for global networking." SHARE Europe Spring Conference, pp. 355-368. Brussels, Belgium. Apr. 1994.
Citrix Winview for Networks Installation Guide. Citrix Systems, Inc. 1990. Version WV.2.3.emj.
Reisman, Richard R. "Raising a Bumper Crop of CD-ROM hybrids." Mass High Tech. Mass Tech Times, Inc. Boston, MA: Sep. 2, 1996. vol. 14, No. 29, p. 17.
Britton, Mike & Van Cleve, Suzanne. "Discover Desktop Conferencing with Netmeeting 2.0." IDG Books Worldwide, Inc. 1997.
"Sony Ericcson MMV-200," [online] Sony Ericcson, 115 pg.,Aug. 2005 [retrieved Oct. 2, 2013], retrieved from the Internet: <http://web.archive.org/web/20070306041635/http://www.sonyericsson.com/downloads/MMV200_UG_R2a_Multilingual1.pdf>, pp. 1-18.
Muller, N. J. "Bluetooth Demystified," Chapter 8, pp. 289-308, Tata McGraw-Hill Education, 2001.

\* cited by examiner

DIGITAL MEDIA COMMUNICATION PROTOCOL

BACKGROUND OF THE INVENTION

1. Field of the Invention

The present specification is generally directed to a digital media communication protocol structured to facilitate transferring and/or transmitting one or more digital media files to and/or from a media terminal and a media node via at least one interactive computer network.

2. Background

As technology continues to develop and play a significant role in today's society, a vast majority of portable devices, including cellular telephones, portable MP3 players, handheld or portable game consoles, Personal Digital Assistants ("PDA"), etc. are equipped with memory devices, such as hard drives and/or removable flash or memory cards, which are capable of holding or storing large amounts of data and or digital media files including digital photographs, videos, audio/music files, etc. Accordingly, with the advent of such devices having these capabilities, individuals or users are more inclined to carry around their media files, such as, for example, digital photo albums, family videos, and/or favorite music tracks.

The drawback to the above noted portable media devices, however, is that many of the devices include relatively small display screens, some of which display poor quality photos and/or videos. In addition, the speakers associated with the corresponding portable device(s) are typically rather small and produce minimal or poor sound therefrom.

In addition, the individuals or users of the media devices may desire to share the digital media files and/or transfer, display, or play the files on a computer or other media device equipped with a larger or better quality screen, or having higher quality speakers than that disposed on the portable device(s). In addition, some media devices may have better editing software, or have access to the World Wide Web to further distribute the digital media files.

Accordingly, it would be advantageous if the digital media communication protocol of the present specification is structured to facilitate transferring or transmitting one or more digital media files between two or more media devices, such as a media terminal and/or a media node, via at least one interactive computer network. In particular, it would be beneficial if the digital media communication protocol includes a communication link structured to bypass at least one or more security measures, such as a password and/or firewall, employed by the interactive computer network, the corresponding networking devices, and/or the particular media devices themselves.

In addition, once the communication link is established it would be particularly beneficial if the various media devices, including the media terminal(s) and/or media node(s), are structured to display, save, edit, manipulate, and/or transfer the one or more digital media files.

SUMMARY

The present specification is directed to a digital media communication protocol having at least one media terminal and at least one media node. In particular, the media terminal of at least one embodiment includes a computer, including but not limited to a desktop computer, mobile or laptop computer, PDA, cellular telephone, etc., and is disposed in an accessible relation to one or more interactive computer networks. In at least one embodiment, the media node includes, but is in no way limited to, a portable device such as, for example, a mobile computer, PDA, cellular telephone, handheld game console, portable MP3 player, etc. In yet another embodiment, however, the media node includes a desktop computer or other like device. Furthermore, the interactive computer network of the present specification may include any one or more computer networks, including home, office, private, and/or limited networks, as well as access to the World Wide Web, for example, via the Internet.

In addition, at least one embodiment of the present system includes a wireless range structured to permit authorized access to the one or more interactive computer networks. Moreover, the media node(s) is disposable within the wireless range, wherein the media node is detectable by the media terminal disposed in accessible relation to the interactive computer network. The present specification further includes a communication link initiated by the media terminal and structured to dispose the media terminal and the media node in a communicative relation with one another via the interactive computer network.

Once the communication link is established, the media terminal and the media node are structured to transmit at least one digital media file therebetween via the communication link. In particular, the media terminal and/or media node is structured to display, save, edit, manipulate, and/or transfer or send the digital media file.

These and other objects, features and advantages of the present system will become more clear when the drawings as well as the detailed description are taken into consideration.

BRIEF DESCRIPTION OF THE DRAWINGS

For a fuller understanding of the nature of the present system, reference should be had to the following detailed description taken in connection with the accompanying drawings in which.

Like reference numerals refer to like parts throughout the several views of the drawings.

DETAILED DESCRIPTION

Figure 1:
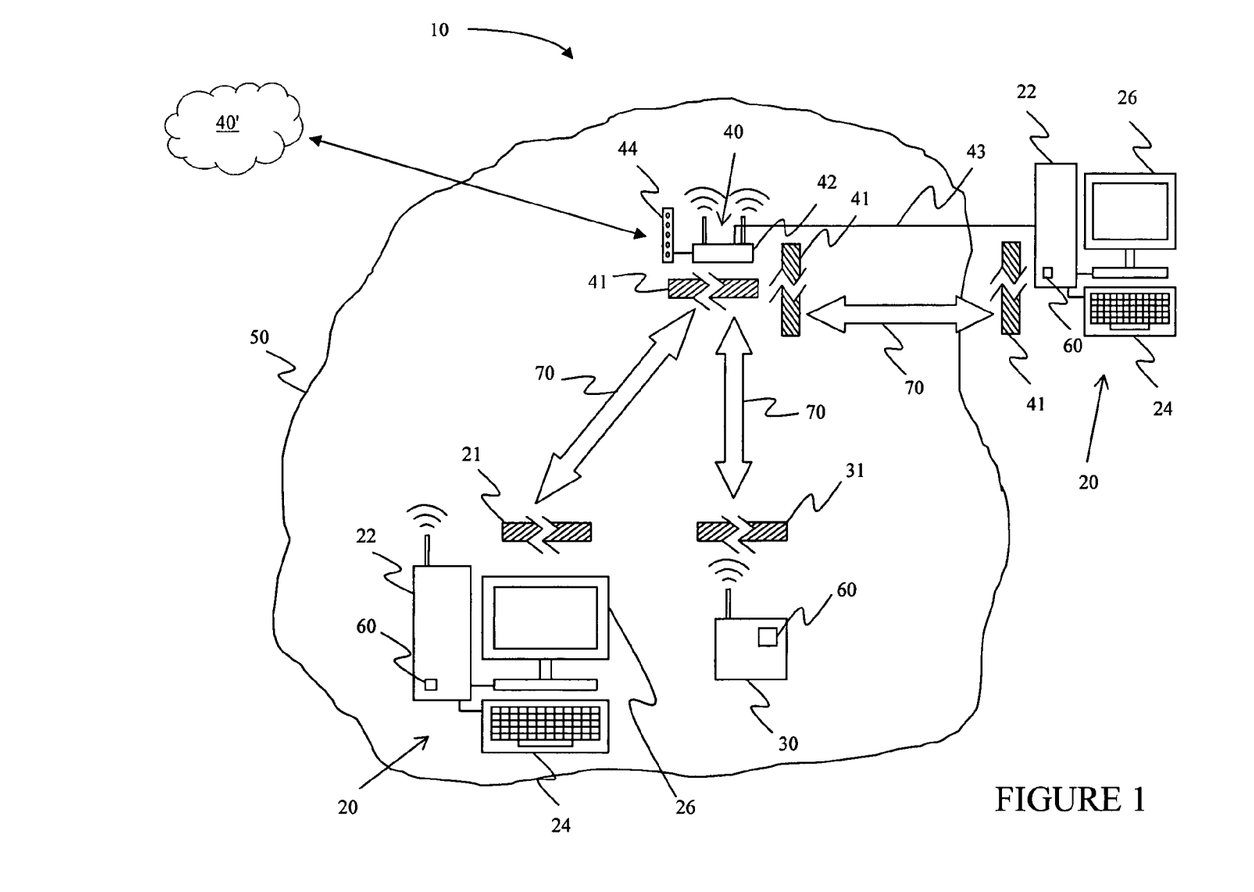
FIG. 1 is a schematic representation of one embodiment of the digital media communication protocol in accordance with the present specification.
Figure 2:
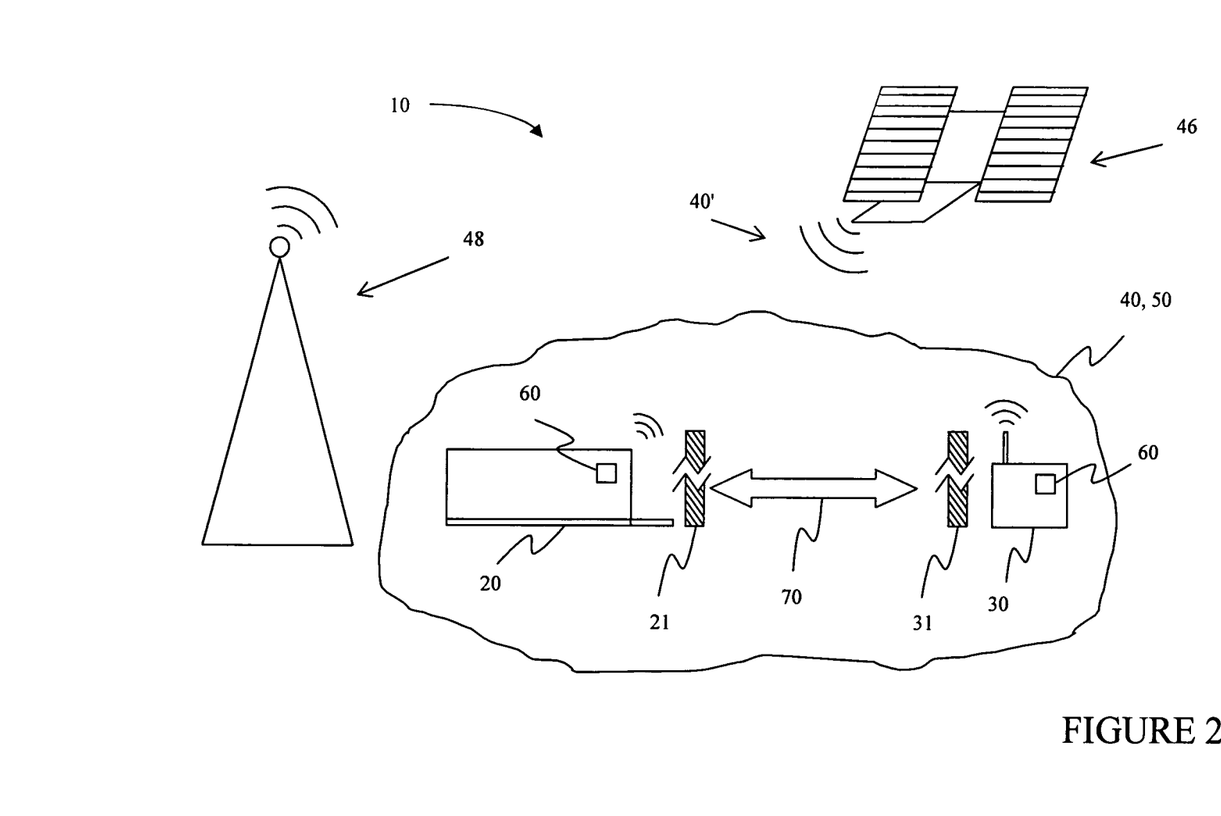
FIG. 2 is a schematic representation of another embodiment of the digital media communication protocol in accordance with the present specification.
Figure 3:
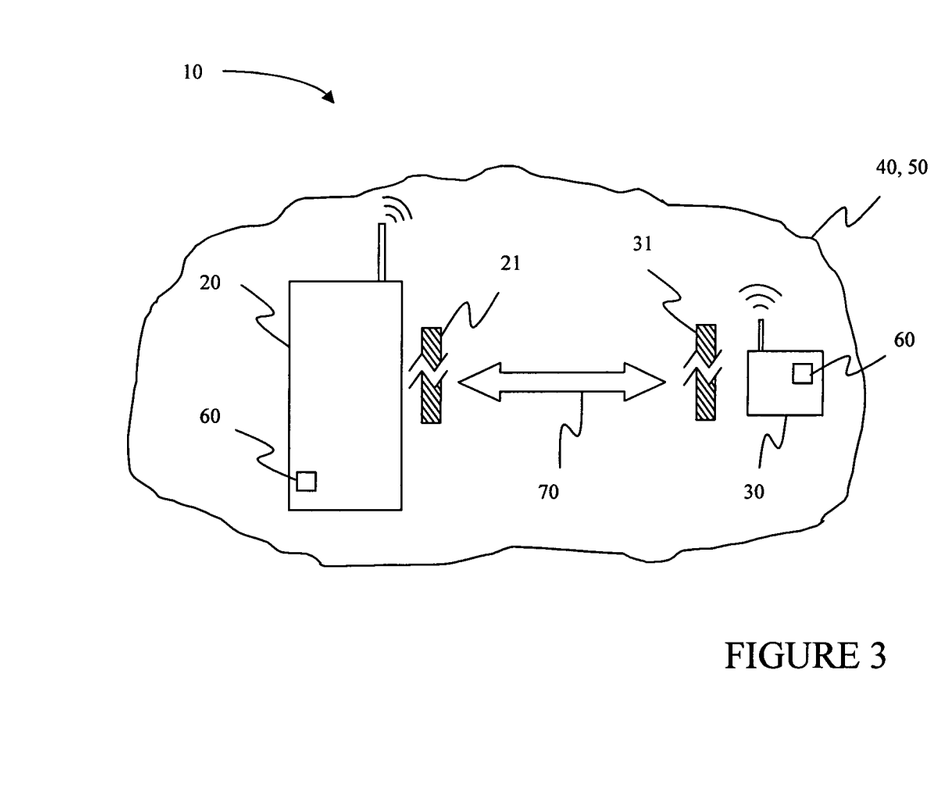
FIG. 3 is a schematic representation of yet another embodiment of the digital media communication protocol in accordance with the present specification.

As shown in the accompanying drawings, the present specification relates to a digital media communication protocol, generally indicated as 10. As illustrated in FIGS. 1 through 3, at least one embodiment of the present protocol or system 10 includes one or more media terminals 20 and one or more media nodes 30. In particular, the media terminal(s) 20 of at least one embodiment is disposed in an accessible relation to at least one interactive computer network 40 and may include, for example, a computer processing device 22, an input device 24, and a display device 26. Accordingly, as shown in FIG. 1, the media terminal(s) 20 of the various embodiments described herein may include a desktop computer, however, any device structured to facilitate the practice of the present system in the intended fashion may be utilized, including but in no way limited to a laptop or notebook computer, PDA, video game console, mobile telephone, etc.

The media node(s) 30 of at least one embodiment of the present system 10 generally includes a portable device such as a cellular or mobile telephone, PDA, portable mp3 player, laptop or notebook computer, or any other digital media device structured to facilitate the practice of the present system in the intended manner. In at least one embodiment, however, the media node 30 is not limited to a portable device, and may include a more stationary device or structure such as, for example, a desktop computer.

Furthermore, the various embodiments of the present specification include at least one interactive computer network 40, 40'. In particular, as illustrated in FIG. 1, at least one embodiment includes one or more home, office, private, limited, or closed interactive computer networks 40 at least partially defined by one or more networking devices 42, including but not limited to a router, access point, and/or switch. Accordingly, the interactive computer network 40 may include a Local Area Network ("LAN"), Wide Area Network ("WAN"), Private Area Network ("PAN"), peer-to-peer network, Bluetooth network, etc. As best shown in FIGS. 2 and 3, it is also contemplated that, especially wherein the interactive computer network 40 is a Bluetooth or peer-to-peer network, the media terminal(s) 20 and/or the media node(s) 30 can function as the networking device(s) 42, at least to the extent of defining the interactive computer network 40. Additionally, and referring again to FIG. 1, at least one interactive computer network 40' of at least one embodiment includes access to the World Wide Web, for example via the Internet. Such access to the World Wide Web 40' may be facilitated in any manner, including but not limited to, via a cable or DSL modem 44, as shown in FIG. 1, or via one or more satellites 46 and/or one or more towers or base stations 48, as illustrated in FIG. 2.

In addition, and still referring to FIGS. 1 through 3, at least one embodiment of the present system 10 includes a wireless range 50 structured to permit access to the one or more interactive computer networks 40. In particular, as shown in FIG. 1, the wireless range 50 may be at least partially defined by networking devices 42, such as a wireless router, access point, switch, etc. In yet another embodiment, as shown in FIGS. 2 and 3, however, the wireless range 50 may be partially defined by the media terminal 20 and/or media node 30, such as, for example, wherein the interactive computer network 40 includes a Bluetooth or peer-to-peer network.

In addition, and as an attempt to minimize or eliminate unauthorized access or security breaches to the interactive computer network 40, the interactive computer network 40 and/or the various networking device(s) 42 may include one or more networking device security measures 41 including a firewall, and/or passwords/keys such as, for example, Wi-Fi Protected Access ("WPA") keys, and/or Wireless Application Protocol ("WAP") keys. Accordingly, only authorized individuals or computers may generally have access to the interactive computer network 40 through the firewall, via use of the password(s)/key(s), and/or any other networking device security measure(s) 41.

The present system 10 further includes at least one digital media file 60 initially disposed or saved on at least one of the media terminal(s) 20 or media node(s) 30. Specifically, the digital media file(s) 60 may be disposed on the media terminal(s) 20, the media node(s) 30, or both. However, it should be apparent that for purposes of the present system 10, the digital media file 60 need not necessarily be created or originated on either the media terminal(s) 20 or the media node(s) 30. In particular, the digital media file(s) 60 may include virtually any electronic file or data such as a digital photograph, video, audio, animation, text, or any other electronic document or object.

Moreover, in at least one embodiment of the present system 10, the media node(s) 30 is disposable within the wireless range 50, wherein the media node 30 is detectable by the media terminal 20. In particular, as stated above, in at least one embodiment, the media node 30 includes a portable device, such as a mobile or cellular phone, PDA, laptop, etc. Accordingly, the media node 30 may be disposed within, i.e., enter, the confines of the wireless range 50, for example, when a user or individual carries the media node 30 therein. In addition, for purposes of the present system 10, the media node 30 may be disposed within the wireless range 50 when the device is powered on, activated, or otherwise configured into a discoverable and/or detectable state while simultaneously being physically disposed within the confines of the wireless range 50, and as such, the media node 30 need not necessarily be portable or easily movable. For instance, while physically disposed within the confines of the wireless range 50, the media node(s) 30 may be powered on or otherwise have wireless or Bluetooth capabilities activated.

Furthermore, the media terminal(s) 20 disposed in accessible relation to the interactive computer network 40 are structured to detect the media node(s) 30 as the media node(s) 30 is disposed within the confines of or is otherwise detectable within the wireless range 50. Particularly, in at least one embodiment, each media node 30 includes a node identifier structured to distinguish one media node 30 within the wireless range 50 from another. For example, the node identifier may include a device name, model/serial number, Media Access Control ("MAC") address, or Internet Protocol ("IP") address. Accordingly, as the media node 30 enters or is otherwise disposed within the wireless range 50, the media terminal 20 is structured to detect and/or identify the media node 30, for example, by the corresponding node identifier.

In addition, at least one embodiment of the present system 10 includes a terminal program disposed in an accessible relation to the media terminal 20. In particular, the terminal program of at least one embodiment is a computer software program structured to facilitate the practice of the present system 10 in the intended fashion, at least from the media terminal 20 side of the system 10. The terminal program, of at least one embodiment, may be disposed on the media terminal 20, such as, for example, on a hard drive, or other memory device associated with the media terminal 20. In yet another embodiment, however, the terminal program may be accessible via the at least one interactive network 40, 40', such as, for example, via the World Wide Web. For example, in the embodiment wherein the terminal program is accessible via the World Wide Web, a user may direct a web browser disposed in the media terminal 20 to a particular web site, which then runs or executes the terminal program and/or downloads the terminal program to the media terminal 20.

Either way, the terminal program may include at least one script which is structured to consistently or periodically monitor the wireless range 50 associated with the interactive computer network 40 for the existence of media nodes 30. When a media node 30 is disposed within the wireless range 50, the terminal program may be structured or configured to automatically alert a user at the media terminal 20 of the existence or detection of the media node 20. In particular, the terminal program may deploy a pop-up display, play an audio alarm or tone, etc. On the other hand, the terminal program may be structured or configured to alert or notify the user of any detected media nodes 30 only upon the user's specific instructions. For example, the media terminal 20, and in particular the terminal program thereof, may be structured to list or display the media nodes 30 currently disposed within the wireless range 50 upon the user clicking on or otherwise manipulating a corresponding option of the terminal program.

At least one embodiment of the present system 10 further includes a communication link 70 structured to dispose the media terminal(s) 20 and the media node(s) 30 in a communicative relation with one another via the interactive computer network 40. In particular, the communication link 70 of the various embodiments of the present system 10 is initiated or requested by the media terminal 20. As stated above, the media terminal 20 is structured to detect the media node(s) 30 disposed within the wireless range 50. As also stated above, the media node 30 may, but need not, however, be configured to have access to the interactive computer network 40. For example, the interactive computer network 40 and/or the corresponding networking device(s) 42 may be equipped with one or more security measures 41, including a WEP key or other password. The media node 30 may, but need not have access to the WEP key or other security measure 41 so as to access the corresponding interactive computer network 40. Even so, the media terminal 20 is structured to initiate a communication link 70 with the one or more detected media nodes 30 disposed within the wireless range 50, for example, by sending and/or transmitting a request to the corresponding media node(s) 30 to establish a communication link 70 therewith via the interactive computer network 40. As illustrated in FIG. 1, the media terminal 20 need not be disposed within the wireless range 50 in order to detect the media nodes 30 or to initiate a communication link 70 therewith. In at least one embodiment of the present system 10, the media terminal 20 does, however, need to be disposed in an accessible relation with the interactive computer network 40, for example, wirelessly or via a direct cable 43.

More in particular, the communication link 70 of at least one embodiment of the present specification is structured to bypass one or more media terminal security measures 21, media node security measures 31, and/or networking device security measures 41. Moreover, the security measures 21, 31, 41 may includes passwords, keys, firewalls, etc. structured to minimize or eliminate unauthorized access to the corresponding media terminal 20, media node 30, networking device(s) 42, and/or interactive computer network 40, 40'. Referring again to FIG. 1, in the embodiment wherein the interactive computer network 40 and the wireless range 50 are at least partially defined by networking device(s) 42, such as a router, access point, or switch, once established, the communication link 70 is structured to be disposed between the media terminal 20 and the media node 30, and through the corresponding networking device(s) 42. Particularly, in at least one implementation of the present system 10, because the media terminal 20 is disposed in an accessible relation to the interactive computer network 40, and because the communication link 70 is initiated by the media terminal 20, the communication link 70 can be established regardless of whether the corresponding media node 30 independently has access to the interactive computer network 40. In addition, the initiation of the communication link 70 by the media terminal 20, such as through a request to establish a communication link 70, at least partially allows the communication link 70 to bypass the firewall or other media terminal security measure(s) 21.

Moreover, the media terminal 20 of at least one embodiment of the present system 10 may be structured or configured to automatically initiate a communication link 70 with the detected media nodes 30. However, more practically, a user in control of the media terminal 20 may direct the media terminal 20 to initiate the communication link 70 with one or more selected media node(s) 30, for example, via the terminal program. Similarly, the media node 30 may be structured or configured to automatically accept or decline creation of the communication link 70 initiated by the media terminal 20. However, in at least one embodiment of the present system 10, the media node(s) 30 may be structured or configured for a user in control of the media node 30 to selectively accept or decline the creation or establishment of a communication link 70 initiated by the corresponding media terminal 20. As such, in at least one embodiment, the media node 30 includes one or more node programs structured to facilitate the practice of the present system 10 in the intended fashion, at least from the media node 30 side of the system 10.

Once the communication link 70 is initiated, accepted, and/or ultimately established between the media terminal 20 and the media node 30, the digital media file(s) 60 may be selectively transmitted therebetween. In particular, if the digital media file 60 is initially disposed on the media node 30, the media node 30 and the media terminal 20 may cooperatively communicate via the communication link 70 such that the digital media file 60 may be transmitted from the media node 30 to the media terminal 20. In addition, the converse is also true. Particularly, if the digital media file 60 is disposed on the media terminal 20, the media node 30 and the media terminal 20 may cooperatively communicate via the communication link 70 such that the digital media file 60 may be transmitted from the media terminal 20 to the media node 30. Furthermore, in at least one embodiment of the present system 10, the device on which the digital media file 60 is initially disposed, such as the media node 30 or the media terminal 20, is structured to "push" the digital media file 60 to the receiving device 20, 30 via the communication link 70. Similarly, in at least one embodiment, once the communication link 70 is established, the receiving device 20, 30 is structured to "pull" the digital media file 60 from the transmitting device 30, 20 via the communication link 70.

For illustrative purposes only, the communication link 70, the terminal program, and/or the node program may be structured to include a selective set of parameters which define or limit the permissions associated with the communication link 70. In particular, in at least one embodiment, the selective set of parameters may include the option of transmitting the digital media file 60 via the communication link 70 merely for purposes of displaying and/or playing the digital media file 60, saving the digital media file 60, manipulating or otherwise editing the digital media file 60, etc. In the various embodiments of the present system 10, it is contemplated that these parameters may be selected from either the media terminal 20 or the media node 30, at various times. For instance, the parameters may be selected by the media terminal 20, or a user in control thereof, when the communication link 70 is initiated, or by either the media terminal 20 or the media node 30 when the communication link 70 is accepted or created.

Furthermore, it is contemplated that the protocol 10 of the present system includes a plurality of versions of the terminal program and/or the node program, stated and described above. For instance, at least one embodiment includes at least one limited version of the terminal and/or node programs and at least one full version of the programs. It is contemplated that the limited versions of the terminal and/or node programs are distributed at no cost or at least a lower cost than the corresponding full versions, and as such, provide limited functionality. Of course, the terminal and/or node programs, whether the limited and/or full versions, may come pre-installed with the corresponding media terminal 20 or media node 30.

Figure 4:
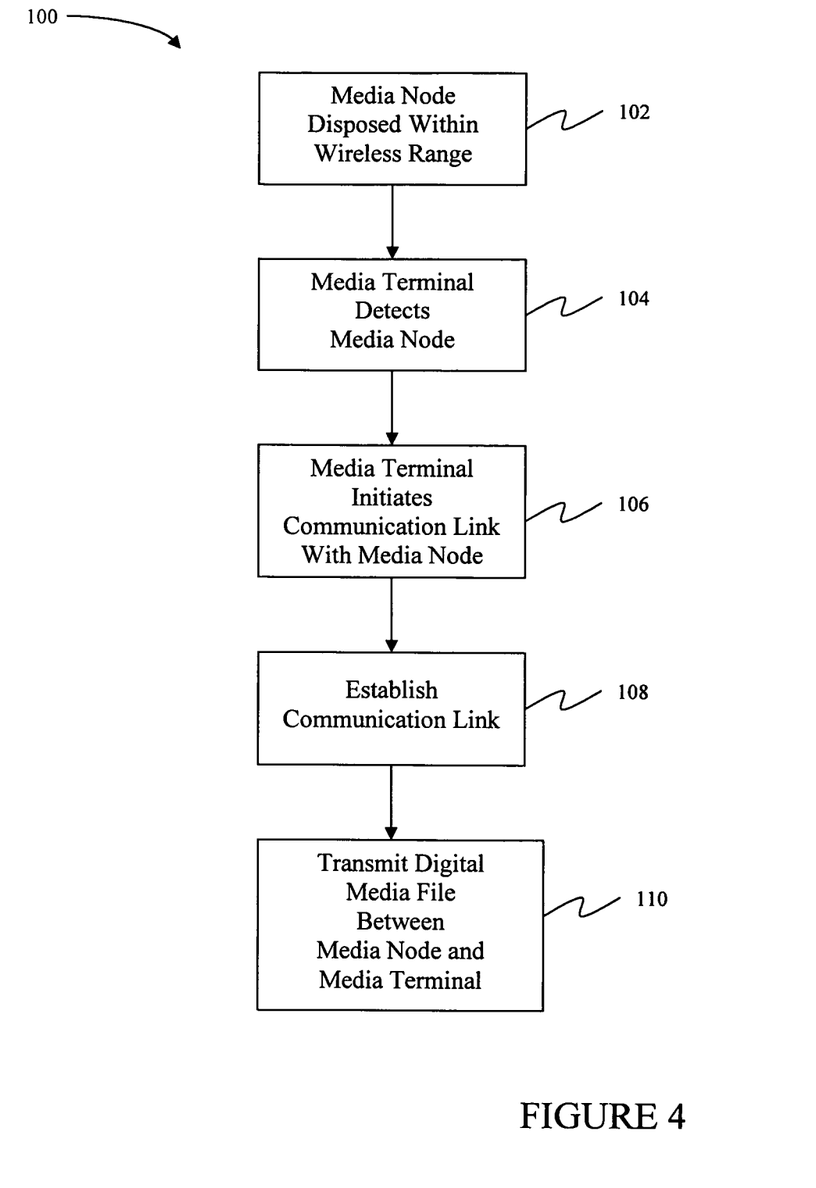
FIG. 4 is a partial flow chart of at least one illustrative implementation of the digital media communication protocol of the present specification.

Moreover, for illustrative purposes only, FIG. 4 shows one implementation of the system 10 in accordance with the present specification, generally indicated as 100. In particular, and as above, in at least one embodiment, the media node 30 may include a portable device, such as for example, a cellular telephone, PDA, or mobile computer. For purposes of the illustrative implementation of FIG. 4, the interactive computer network 40 includes a wireless range 50 located in one or more offices or rooms, wherein the media terminal 20 is also disposed within one of the offices or rooms in accessible relation to the interactive computer network 40.

Furthermore, the digital media file 60 of the present illustrative implementation of FIG. 4 may be disposed on the media node 30, whereas the user in control of the media node 30 desires to display the digital media file 60 on the display device 26 of the media terminal 20. As shown in FIG. 4, the media node 30 may be disposed within the wireless range 102. For example, the user in control of, and/or having possession of, the media node 30 may walk into the office which is disposed within the wireless range 50. As stated above, once the media node 30 is disposed within the wireless range 50, as shown at 104, the media terminal 20 is structured to detect the media node 20. The media terminal 20 may then initiate a communication link 70 between the media terminal 20 and the media node 30 via the interactive computer network 40, as shown at 106, for instance, by sending a request thereto. The media node 30 may then accept the request by the media terminal 20, which establishes the communication link 70, as illustrated at 108 in FIG. 4. Once the communication link 70 is established, the digital media file 60 may be transmitted, i.e., "pushed" or "pulled", between the media node 30 and the media terminal 20, as shown at 110.

More in particular, because the digital media file 60, for purposes of the illustrative implementation shown in FIG. 4, is initially disposed on the media node 30, the digital media file 60 may be transmitted, i.e., "pushed" or "pulled", to the media terminal 20 from the media node 30 via the communication link 70. In particular, the media terminal 20 may display the digital media file 60, save the digital media file 60, and/or manipulate or edit the digital media file 60. In addition, the media terminal 20, in at least one embodiment, may be structured to transmit the digital media file 60 and/or the edited media file back to the media node 30 via the communication link 70.

Since many modifications, variations and changes in detail can be made to the system as present herein, it is intended that all matters in the foregoing description and shown in the accompanying drawings be interpreted as illustrative and not in a limiting sense. Thus, the scope of the present system should be determined by the appended claims and their legal equivalents.

Now that the invention has been described,

What is claimed is:

1. A digital media communication protocol, comprising:
   at least one media terminal disposed in an accessible relation to at least one interactive computer network,
   a wireless range structured to permit authorized access to said at least one interactive computer network,
   at least one media node disposable within said wireless range, wherein said at least one media node is detectable by said at least one media terminal,
   at least one digital media file initially disposed on at least one of said at least one media terminal or said at least one media node, said at least one media terminal being structured to detect said at least one media node disposed within said wireless range,
   a communication link structured to dispose said at least one media terminal and said at least one media node in a communicative relation with one another via said at least one interactive computer network,
   said communication link being initiated by said at least one media terminal,
   said at least one media node and said at least one media terminal being structured to transmit said at least one digital media file therebetween via said communication link, and
   said communication link is structured to bypass at least one media terminal security measure.

2. The digital media communication protocol recited in claim 1 wherein
   said digital media file is initially disposed on said at least one media node.

3. The digital media communication protocol recited in claim 2 wherein
   said at least one media terminal is structured to display said at least one digital media file.

4. The digital media communication protocol recited in claim 2 wherein
   said at least one media terminal is structured to store said at least one digital media file.

5. The digital media communication protocol recited in claim 2 wherein
   said media terminal is structured to manipulate said at least one digital media file.

6. The digital media communication protocol recited in claim 1 wherein
   said digital media file is initially disposed on said at least one media terminal.

7. The digital media communication protocol recited in claim 6 wherein
   said at least one media terminal is structured to transmit said at least one digital media file to said at least one media node via said communication link.

8. The digital media communication protocol recited in claim 6 wherein
   said at least one media node is structured to display said digital media file.

9. The digital media communication protocol recited in claim 6 wherein
   said at least one media node is structured to store said at least one digital media file.

10. The digital media communication protocol recited in claim 6 wherein
    said at least one media node is structured to manipulate said at least one digital media file.

11. The digital media communication protocol recited in claim 1 wherein
    said at least one media node includes a portable device.

12. The digital media communication protocol recited in claim 1 wherein
    said at least one media terminal security measure includes a firewall.

13. The digital media communication protocol recited in claim 1 wherein
    said communication link is structured to bypass at least one networking device security measure.

14. The digital media communication protocol recited in claim 1 further comprising
    at least one terminal program disposed in accessible relation to said at least one media terminal and structured to facilitate transmission of said at least one digital media file via said communication link.

15. The digital media communication protocol recited in claim 14 wherein
said terminal program is disposed on said at least one media terminal.

16. The digital media communication protocol recited in claim 14 wherein said terminal program is accessed via said at least one interactive computer network.

17. A digital media communication protocol, comprising:
at least one media terminal and at least one media node disposed in an accessible relation with at least one interactive computer network,
at least one digital media file initially disposed on at least one of said media terminal or said media node, said at least one media terminal structured to detect said at least one media node,
a communication link structured to dispose said at least one media terminal and said at least one media node in a communicative relation with one another via said interactive computer network,
said communication link being initiated by said at least one media terminal,
said at least one media node and said at least one media terminal structured to transmit said at least one digital media file therebetween via said communication link, wherein
said communication link is structured to bypass at least one media terminal security measure.

18. The digital media communication protocol recited in claim 17 further comprising
a wireless range structured to permit authorized access to said at least one interactive computer network.

19. The digital media communication protocol recited in claim 18 wherein
said at least one media node is disposable within said wireless range and detectable by said at least one media terminal.

20. The digital media communication protocol recited in claim 17 further comprising
a selective set of parameters associated with said communicative relation between said at least one media terminal and said at least one media node.

21. A digital media communication protocol, comprising:
at least one media terminal disposed in an accessible relation to at least one interactive computer network,
a wireless range structured to permit authorized access to said at least one interactive computer network,
at least one media node disposed within said wireless range, said media node including a portable device being detectable by said at least one media terminal,
at least one digital media file disposed on at least one of said at least one media terminal or said at least one media node, said at least one media terminal structured to detect said at least one media node,
a communication link structured to dispose said at least one media terminal and said at least one media node in a communicative relation with one another via said interactive computer network,
said communication link being initiated by said at least one media terminal,
said at least one digital media file structured to be selectively transmitted between said at least one media node and said at least one media terminal, wherein
said communication link is structured to bypass at least one media terminal security measure.

22. The digital media communication protocol recited in claim 21 wherein
said communication link is structured to bypass at least one wireless range security measure.

23. A digital media communication protocol, comprising:
at least one media terminal disposed in an accessible relation to at least one interactive computer network,
a wireless range structured to permit authorized access to said at least one interactive computer network,
at least one media node disposed within said wireless range, wherein said at least one media node is detectable by said at least one media terminal,
at least one digital media file disposed on said at least one media node, said at least one media terminal being structured to detect said at least one media node,
a communication link structured to dispose said at least one media terminal and said at least one media node in a communicative relation with one another via said at least one interactive computer network,
said communication link being initiated by said at least one media terminal and structured to bypass at least one media terminal security measure,
said media node structured to transmit said at least one digital media file to said media terminal via said communication link.

* * * * *